(12) United States Patent
Grootaert et al.

(10) Patent No.: US 6,846,880 B2
(45) Date of Patent: Jan. 25, 2005

(54) FLUOROPOLYMER COMPOSITIONS

(75) Inventors: Werner M. A. Grootaert, Oakdale, MN (US); Robert E. Kolb, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 74 days.

(21) Appl. No.: 10/269,615

(22) Filed: Oct. 11, 2002

(65) Prior Publication Data

US 2004/0072959 A1 Apr. 15, 2004

(51) Int. Cl.$^7$ .................................................. C08F 8/32
(52) U.S. Cl. ................ 525/259; 525/326.2; 525/326.3; 525/276
(58) Field of Search ................................. 525/259, 276, 525/326.2, 326.3

(56) References Cited

U.S. PATENT DOCUMENTS

| | | |
|---|---|---|
| 3,218,270 A | 11/1965 | Delman et al. |
| 3,686,143 A | 8/1972 | Bowman |
| 3,752,787 A | 8/1973 | de Brunner |
| 4,281,092 A | 7/1981 | Breazeale |
| 4,434,106 A | 2/1984 | Rosser et al. |
| 4,525,539 A | 6/1985 | Feiring |
| 4,567,301 A | 1/1986 | Rosser et al. |
| 5,268,405 A | 12/1993 | Ojakaar et al. |
| 5,488,142 A | 1/1996 | Fall et al. |
| 5,554,680 A | 9/1996 | Ojakaar |
| 5,565,512 A | 10/1996 | Saito et al. |
| 5,585,449 A | 12/1996 | Arcella et al. |
| 5,621,145 A | 4/1997 | Saito et al. |
| 5,700,879 A | 12/1997 | Yamamoto et al. |
| 5,767,204 A | 6/1998 | Iwa et al. |
| 6,191,208 B1 | 2/2001 | Takahashi |
| 6,281,296 B1 | 8/2001 | MacLachlan et al. |
| 2002/0026014 A1 | 2/2002 | Bish et al. |

FOREIGN PATENT DOCUMENTS

| | | |
|---|---|---|
| EP | 0 661 304 A1 | 7/1995 |
| EP | 0 769 521 A1 | 4/1997 |
| EP | 0 784 064 A1 | 7/1997 |
| JP | 2002-114824 | 4/2002 |
| WO | WO 99/48939 | 9/1999 |
| WO | WO 01/46116 | 6/2001 |
| WO | WO 02/48200 | 6/2002 |

*Primary Examiner*—Bernard Lipman
(74) *Attorney, Agent, or Firm*—Dean M. Harts

(57) ABSTRACT

Compositions comprising a fluoropolymer having interpolymerized units derived from a nitrogen-containing cure site monomer and an amidine-containing curative are provided.

Also provided are a method of making a fluoropolymer and fluoropolymer articles containing curable or cured fluoropolymer compositions.

32 Claims, No Drawings

FLUOROPOLYMER COMPOSITIONS

TECHNICAL FIELD

This invention relates to fluoropolymer compositions with amidine-containing curative compounds, curing such compositions, and articles comprising such compositions.

BACKGROUND

Fluoropolymers include, for example, crosslinked fluoroelastomers, curable fluoroelastomer gums, and semi-crystalline fluoroplastics. Fluoroelastomers generally are tolerant to high temperatures and harsh chemical environments. Thus, they are particularly useful as seals, gaskets, and molded parts in systems that are exposed to elevated temperatures and/or corrosive chemicals. Such parts are used in the automotive, chemical processing, semiconductor, aerospace, and petroleum industries, among others.

Fluoroelastomers often include a cure-site component to facilitate cure in the presence of a catalyst. One class of useful cure-site components includes nitrile group-containing monomers, for which organotin catalysts have been used as curing components. Such curatives can leave undesirable extractable metal residues in the cured product and are undesirable for environmental reasons. Ammonia-generating compounds have also been used as a cure system component. These cure systems lack the desired level of rheology control during processing. In addition, most known fluoroelastomers are cured into colored or opaque materials. Perfluoroelastomers described as colorless and/or transparent are known, but the compression set of these compositions is rather high even when measured at relatively low temperatures (up to 200° C.).

SUMMARY

In one aspect, the invention relates to a composition that includes a composition comprising a fluoropolymer comprising interpolymerized units derived from a nitrogen-containing cure site monomer and an amidine-containing curative.

In another aspect, the invention relates to a making a fluoropolymer composition comprising forming a mixture of a composition including a fluoropolymer having interpolymerized units derived from a nitrogen-containing cure site monomer and an amidine-containing curative, shaping the mixture, curing the shaped mixture, and optionally heat aging the cured mixture.

The invention also provides articles containing the curable or cured compositions such as sheets, films, hoses, gaskets, and O-rings. The invention is particularly desirable for articles with good physical properties and low compression set at high temperatures, while being translucent, or even transparent, to visible light. Such clear perfluoroelastomers have long been sought and now are provided.

The inventive compositions retain the advantages of the use of nitrogen-containing cure site monomers (e.g., nitrile group containing cure site monomers) such as the high temperature performance properties typically achieved when organotin compounds or ammonia-generating compounds are used as the catalyst system with such cure site monomers. At the same time, the compositions exhibit improved properties, such as better compression set values, compared to materials made using the organotin compounds.

The inventive compositions are useful in applications where high temperature exposure and/or harsh chemical exposure are expected.

The details of embodiments of the invention are set forth in the description below. Other features, objects, and advantages of the invention will be apparent from the description and from the claims below.

DETAILED DESCRIPTION

The composition of the present invention comprises a fluoropolymer comprising interpolymerized units derived from a nitrogen-containing cure site monomer and an amidine-containing curative. The curatives will be described next.

The amidine-containing curative can be a bis-amidine, tris-amidine, or tetra-amidine, or a salt of any of these. In addition, combinations of more than one amidine and/or amidine salt can be used.

In one embodiment, the amidine-containing curative comprises a compound having the general formula X—Y(—Z)$_n$. In this formula, X is a moiety of Formula I:

wherein each R is, independently, H, an optionally substituted alkyl, alkenyl, aryl, alkaryl, or alkenylaryl group, Y is a bond or a linking group, Z is H or a moiety according to Formula I, which may be the same or different than X, and n is an integer from 1 to 3. In addition, the amidine-containing curative can comprise a salt of an XYZ$_n$ material or the precursors of a salt of an XYZ$_n$ material can be provided separately or as a mixture.

"Alkyl" means an aliphatic hydrocarbon group that may be linear or branched having from 1 to about 15 carbon atoms, in some embodiments 1 to about 10 carbon atoms. "Branched" means that one or more lower alkyl groups such as methyl, ethyl, or propyl are attached to a linear alkyl chain. "Lower alkyl" means having 1 to about 6 carbon atoms in the chain, which may be linear or branched. The alkyl group may be substituted by one or more halo atoms, cycloalkyl, or cycloalkenyl groups.

"Alkenyl" means an aliphatic hydrocarbon group containing a carbon-carbon double bond and which may be straight or branched having 2 to about 15 carbon atoms in the chain. Preferred alkenyl groups have 2 to about 10 carbon atoms in the chain, and more preferably 2 to about 6 carbon atoms in the chain. "Lower alkenyl" means 2 to about 4 carbon atoms in the chain which may be straight or branched. The alkenyl group may be substituted by one or more halo atoms, cycloalkyl, or cycloalkenyl groups.

"Cycloalkyl" means a non-aromatic mono- or multicyclic ring system of about 3 to about 12 carbon atoms. Exemplary cycloalkyl rings include cyclopentyl, cyclohexyl, and cycloheptyl. The cycloalkyl group may be substituted by one or more halo atoms, methylene, alkyl, cycloalkyl, heterocyclyl, aralkyl, heteroaralkyl, aryl or heteroaryl. "Hetero" means oxygen, nitrogen, or sulfur in place of one or more carbon atoms.

"Cycloalkenyl" means a non-aromatic monocyclic or multicyclic ring system containing a carbon-carbon double bond and having about 3 to about 10 carbon atoms. The cycloalkenyl group may be substituted by one or more halo atoms, or methylene, alkyl, cycloalkyl, heterocyclyl, aralkyl, heteroaralkyl, aryl, or heteroaryl groups.

"Aryl" means an aromatic carbocyclic radical containing about 6 to about 12 carbon atoms. Exemplary aryl groups include phenyl or naphthyl optionally substituted with one or more aryl group substituents which may be the same or different, where "aryl group substituent" includes hydrogen, alkyl, cycloalkyl, optionally substituted aryl, optionally substituted heteroaryl, aralkyl, aralkenyl, aralkynyl, heteroaralkyl, heteroaralkenyl, heteroaralkynyl, hydroxy, hydroxyalkyl, alkoxy, aryloxy, aralkoxy, carboxy, acyl, aroyl, halo, nitro, cyano, carboxy, alkoxycarbonyl, aryloxycarbonyl, aralkoxycarbonyl, acylamino, aroylamino, alkylsulfonyl, arylsulfonyl, and other known groups.

"Alkaryl" means an aryl-alkyl-group in which the aryl and alkyl are as previously described. "Alkenylaryl" means an aryl-alkenyl-group in which the aryl and alkenyl are as previously described.

The above chemical group descriptions are known in the field and these descriptions are not intended to change the accepted meanings.

In the general formula X—Y(—Z)$_n$, Y can be a bond or a linking group R', which may be, or include, a hetero-atom such as oxygen, sulfur, phosphorous, or nitrogen, and the like. The linking group R' may be an alkyl, alkenyl, aryl, or alkaryl group having from 1 to about 15 carbon atoms, which may be linear or branched, and which may be non-fluorinated, fluorinated, or perfluorinated. When n is 1, Y is a bond or O, S, or a divalent R' group. When n is 2, the linking group is N or a trivalent R' group. When n is 3, the linking group is N$^{(+)}$ or a tetravalent R' group. R' may be a substituted or unsubstituted methyl, methylene, or methine group. Thus, the curative of the invention may be a bis-amidine, tris-amidine, or tetra-amidine.

In the general formula X—Y(—Z)$_n$, Z can be hydrogen or a moiety according to Formula I, which may be the same or different than X.

In one embodiment, the amidine-containing curative is selected from carboxylate salts of an amidine, which amidine and/or salt optionally can be fluorinated or perfluorinated.

In another embodiment, the curative comprises a compound of Formula (II):

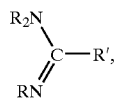
(II)

wherein R' is H, or an optionally substituted alkyl, alkenyl, aryl, alkaryl, or alkenylaryl group, which may be non-fluorinated, partially-fluorinated, or perfluorinated. Particular examples of R' include those of the formula CF$_3$(CF$_2$)$_k$ and CF$_3$O(CF$_2$)$_k$, wherein k is 1–10. One subset of these materials includes those where each R is hydrogen. More particular examples include materials wherein R' has the formula CF$_3$CF$_2$, CF$_3$CF$_2$CF$_2$, CF$_3$OCF$_2$CF$_2$, and optionally wherein each R is H.

In another embodiment, the curative including a material of Formula II may further include a carboxyl compound of Formula (III):

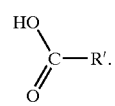
(III)

For example, those composition of Formula III having formula CF$_3$O(CF$_2$)$_k$COOH, wherein k is 1–10 are useful in the present invention. Also useful are the composition wherein the carboxyl compound has the formula CF$_3$(CF$_2$)$_j$COOH, wherein j is 1–15, preferably 1–8, and in certain embodiments more preferably 1–3.

Amidine-containing curatives useful in the present invention include the compounds of the formula:

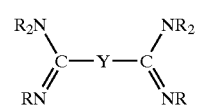
(IV)

wherein Y is a linking group as described above, e.g., as CX$_2$OCX$_2$, (CX$_2$OCX$_2$)$_p$ or (CX$_2$CX$_2$)$_p$ where p is 1–5, each X is independently H, F, or Cl, each R is independently selected from H, a C1–C8 alkyl, alkenyl, a C6–C15 aryl, alkaryl, or alkenaryl, and wherein R is optionally substituted. In certain aspects, each R is independently selected from H, a C1–C6 alkyl or alkenyl, and R optionally is substituted. In particular embodiments, each R is H.

In one embodiment, of the general formula XYZ$_n$, n is 1 and Z is X.

Other amidine-containing curative examples include compounds of the formula:

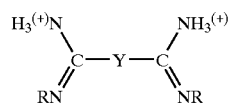

wherein Y is a linking group as described above, and these compounds are used in combination with an anion such as described below and including Cl$^-$, Br$^-$, I$^-$, RCOO$^-$, and the like.

Other amidine-containing curative examples include compounds of the formula:

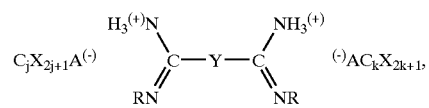

wherein j and k range from 1 to about 12, n is 1 to 5, Y is as described above, each X is independently H, F, or Cl, each R is independently selected from H, a C1–C8 alkyl, alkenyl, a C6–C15 aryl, alkaryl, or alkenaryl, and wherein R is optionally substituted, and A is an anion.

Suitable anions include any known anion that does not detrimentally affect the desired results. For example, the anion can be an acid anion or an acid derivative anion, from an organic or inorganic acid. Particular examples of the anion include COO, SO$_3$, SO$_2$, SO$_2$NH, PO$_3$, CH$_2$OPO$_3$, (CH$_2$O)$_2$PO$_2$, C$_6$H$_4$O, OSO$_3$,

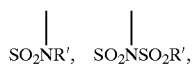

and

preferably COO, $C_6H_4O$, $SO_3$, $OSO_3$, or

and in some embodiments most preferably COO, $SO_3$, and $OSO_3$.

Other amidine-containing curative examples include compounds of the formula:

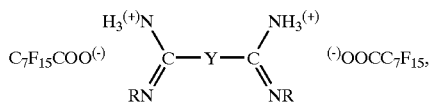

wherein each R is an optionally substituted alkyl, alkenyl, aryl, alkaryl, or alkonylaryl group, which may be non-fluorinated, partially-fluorinated, or perfluorinated, and Y is a linking group. In this embodiment, Y can be selected from $(CX_2OCX_2)_p$ or $(CX_2CX_2)_p$ wherein X is as described above and wherein p is an integer from 1 to 10, preferably 1 to 5, and in one aspect p is 3.

Suitable fluoropolymers include interpolymerized units derived from a nitrogen-containing monomer and, preferably, at least two principal monomers. Examples of suitable candidates for the principal monomer include perfluoroolefins (e.g., tetrafluoroethylene (TFE) and hexafluoropropylene (HFP)), chlorotrifluoroethylene (CTFE), perfluorovinyl ethers (e.g., perfluoroalkyl vinyl ethers and perfluoroalkoxy vinyl ethers), and optionally, hydrogen-containing monomers such as olefins (e.g., ethylene, propylene, and the like), and vinylidene fluoride (VDF). Such fluoropolymers include, for example, fluoroelastomer gums and semi-crystalline fluoroplastics.

When the fluoropolymer is perhalogenated, preferably perfluorinated, it contains at least 50 mole percent (mol %) of its interpolymerized units derived from TFE and/or CTFE, optionally including HFP. The balance of the interpolymerized units of the fluoropolymer (10 to 50 mol %) is made up of one or more perfluoro vinyl ethers and a nitrogen-containing cure site monomer (e.g., a nitrile-containing vinylether or an imidate containing vinylether). The cure site monomer makes up from about 0.1 to about 5 mol % (more preferably from about 0.3 to about 2 mol %) of the elastomer. The invention is useful particularly in providing perfluoropolymers such as perfluoroelastomers.

When the fluoropolymer is not perfluorinated, it contains from about 5 to about 90 mol % of its interpolymerized units derived from TFE, CTFE, and/or HFP, from about 5 to about 90 mol % of its interpolymerized units derived from VDF, ethylene, and/or propylene, up to about 40 mol % of its interpolymerized units derived from a vinyl ether, and from about 0.1 to about 5 mol % (more preferably from about 0.3 to about 2 mol %) of a nitrogen-containing cure site monomer.

The fluoroelastomer compositions of the invention are derived from interpolymerized units of fluorinated monomers such as those having the formula $CF_2=CF-R_f$, wherein $R_f$ is fluorine or a $C_1-C_8$ perfluoroalkyl, along with hydrogen-containing $C_2-C_9$ olefins, which have less than half of the hydrogen atoms substituted with fluorine, more preferably less than one-fourth of the hydrogen atoms substituted with fluorine, and which are non-fluorinated in other embodiments. In some embodiments, the non-fluorinated olefin is absent.

Hydrogen-containing olefins useful in the invention include those of the formula $CX_2=CX-R$, wherein each X is, independently, hydrogen or fluorine or chlorine, R is hydrogen, fluorine, or a $C_1-C_{12}$, preferably $C_1-C_3$, alkyl. Preferred olefins include partially-fluorinated monomers (e.g., vinylidene fluoride) or hydrogen-containing monomers such as olefins including α-olefins (e.g., ethylene, propylene, butene, pentene, hexene, and the like). Combinations of the above-mentioned materials are also useful.

Perfluorinated vinyl ethers also are suitable as comonomers in the present invention. Such perfluorovinylethers include, for example, $CF_2=CFOCF_3$, $CF_2=CFOCF_2CF_2OCF_3$, $CF_2=CFOCF_2CF_2CF_2OCF_3$, $CF_2=CFOCF_2CF_2CF_3$, $CF_2=CFOCF_2CF(CF_3)OCF_2CF_2CF_3$, and $CF_2=CFOCF_2CF(CF_3)OCF_2CF(CF_3)OCF_2CF_2CF_3$.

One example of a useful fluoropolymer is composed of principal monomer units of tetrafluoroethylene and at least one perfluoroalkyl vinyl ether. In such copolymers, the copolymerized perfluorinated ether units constitute from about 1 to about 60 mol % (more preferably 10 to 40 mol %) of total monomer units present in the polymer.

One or more other fluoropolymers may be incorporated into the fluoropolymer having interpolymerized units derived from a nitrogen-containing cure site monomer. In addition, one or more other fluoropolymers (which may include one or more copolymers) may be blended with the fluoropolymer (which may comprise a copolymer) having interpolymerized units derived from a nitrogen-containing cure site monomer. Such other fluoropolymers useful in a blend and/or copolymer include the entire array described above, and including homopolymers and copolymers comprising the interpolymerized units mentioned above. For example, polytetrafluoroethylene (PTFE) and PFA (tetrafluoroethylene-perfluorovinylether) are useful. The other fluoropolymer(s) may lack interpolymerized units derived from a nitrogen-containing cure site monomer and/or may include reactive sites adapted to a selected curative system. For example, two different fluoropolymers, each having interpolymerized units derived from a nitrogen-containing cure site monomer, such as a monomer comprising a nitrile group, may be blended to provide the fluoropolymer for the present invention.

Another fluoropolymer may be included along with another curative, such as described below, to provide particular properties. For example, a fluoropolymer suitable for peroxide curing and a peroxide curative may be included to improve chemical stability. Such a blend balances the thermal stability and the chemical stability of the resultant blend, and also may provide economic benefits. These other curatives also may be used to cure a blend of fluoropolymers having nitrogen-containing cure site monomers without the need to include a fluoropolymer lacking a nitrogen-containing cure site monomer.

The fluoropolymer(s) having nitrogen-containing cure site monomers preferably make up enough of the total fluoropolymer to provide increased thermal stability over a comparative fluoropolymer that lacks the composition of the present invention. This amount is generally at least 25 weight percent (wt %), more preferably at least 50 wt %, of the total fluoropolymer in the invention. In some embodiments, the fluoropolymer component is comprised entirely of fluoropolymer(s) with nitrogen-containing interpolymerized units.

The useful fluoropolymers may be prepared by known methods. For example, the polymerization process can be carried out by free-radical polymerization of the monomers as an aqueous emulsion polymerization or as a solution polymerization in an organic solvent. When fluoropolymer blends are desired, a preferable route of incorporation is through blending the fluoropolymer latices in the selected ratio, followed by coagulation and drying.

The nature and the amount of end groups are not critical to the fluoroelastomers of the invention. For example, the polymer can contain $SO_3^{(-)}$ end groups generated by an APS/sulfite system, or the polymer may contain $COO^{(-)}$ end groups generated by an APS initiator system or the fluoroelastomer can have "neutral" end groups, e.g., those generated by the use of fluorosulfinate initiator systems or organic peroxides. Chain transfer agents of any kind can significantly reduce the number of end groups. If desired, such as for improved processing, the presence of strong polar end groups such as $SO_3^{(-)}$ can be minimized and in the case of $COO^{(-)}$ or other unstable end groups, the amount can be reduced through known post treatments (e.g., decarboxylation, post-fluorination).

The cure site component allows one to cure the fluoropolymer. The cure site component can be partially or fully fluorinated. At least one cure site component of at least one fluoropolymer comprises a nitrogen-containing group. Examples of nitrogen-containing groups useful in the cure site monomers of the present invention include nitrile, imidate, amidine, amide, imide, and amine-oxide groups. Useful nitrogen-containing cure site monomers include nitrile-containing fluorinated olefins and nitrile-containing fluorinated vinyl ethers, such as: $CF_2=CFO(CF_2)_LCN$; $CF_2=CFO[CF_2CF(CF_3)O]_q(CF_2O)_yCF(CF_3)CN$; $CF_2=CF[OCF_2CF(CF_3)]_rO(CF_2)_tCN$; and $CF_2=CFO(CF_2)_uOCF(CF_3)CN$, wherein L=2–12; q=0–4; r=1–2; y=0–6; t=1–4; and u=2–6. Representative examples of such monomers include $CF_2=CFO(CF_2)_3OCF(CF_3)CN$, perfluoro(8-cyano-5-methyl-3,6-dioxa-1-octene), and $CF_2=CFO(CF_2)_5CN$.

Another suitable cure site component useful in the present invention is a fluoropolymer or fluorinated monomer material containing a halogen that is capable of participation in a peroxide cure reaction. Such a halogen may be present along a fluoropolymer chain and/or in a terminal position. Typically the halogen is bromine or iodine. Copolymerization is preferred to introduce the halogen in a position along a fluoropolymer chain. In this route, a selection of the fluoropolymer components mentioned above are combined with a suitable fluorinated cure site monomer. Examples of the bromo- or iodo-fluorolefins include: bromodifluoroethylene, bromotrifluoroethylene, iodotrifluoroethylene, 1-bromo-2,2-difluoroethylene, and 4-bromo-3,3,4,4-tetrafluorobutene-1, and the like, and examples of the bromo- or iodo-fluorovinyl ethers include: $BrCF_2OCF=CF_2$, $BrCF_2CF_2OCF=CF_2$, $BrCF_2CF_2CF_2OCF=CF_2$, $CF_3CF(Br)CF_2OCF=CF_2$, and the like. In addition, non-fluorinated bromo- or iodo-olefins, e.g., vinyl bromide and 4-bromo-1-butene, can be used.

The amount of cure site component in a side chain position of the fluoropolymer is generally from about 0.05 to about 5 mol % (more preferably from 0.1 to 2 mol %).

The cure site component may also occur in the terminal position of a fluoropolymer chain. Chain transfer agents or initiators are used to introduce the halogen in a terminal position. Generally, a suitable chain transfer agent is introduced in the reaction medium during polymer preparation, or derived from a suitable initiator.

Examples of useful chain transfer agents include those having the formula $R_fZ_x$ wherein $R_f$ is a substituted or unsubstituted $C_{1-C12}$ fluoroalkyl radical, which may be perfluorinated, Z is Br or I, and x is 1 or 2. Specific examples involving bromide include: $CF_2Br_2$, $Br(CF_2)_2Br$, $Br(CF_2)_4Br$, $CF_2(Cl)Br$, $CF_3CF(Br)CF_2Br$, and the like.

Examples of useful initiators include $NaO_2S(CF_2)_nX$, wherein X is Br or I, and n is 1–10.

The amount of cure site component in a terminal position in the fluoropolymer is generally from about 0.05 to about 5 mol % (more preferably from 0.1 to 2 mol %).

Combinations of cure site components also are useful in the present invention. For example, a fluoropolymer containing a halogen that is capable of participation in a peroxide cure reaction may also contain a nitrogen-containing cure site component such as a nitrile group-containing cure site component. Generally, from about 0.1 to about 5 mol % (more preferably from about 0.3 to about 2 mol %) of the total cure site component is incorporated into the fluoropolymer.

An effective amount of the curative is used to crosslink the fluoropolymer. When the amount of curative is too low, the fluoropolymer may not crosslink sufficiently to develop the desired physical properties and/or may crosslink more slowly than desired. When the amount of curative is too high, the fluoropolymer may crosslink into a material that is less compliant than desired and/or may crosslink too rapidly for the desired process conditions. The selection of the particular parts of a composition can affect the amount of curative desired. For example, the type and/or amount of filler selected may retard or accelerate curing relative to a similar, but unfilled, composition, requiring an appropriate adjustment in the amount of curative that is known to those skilled in the field.

The composition of the fluoropolymer also affects the amount of one or more curatives. For example, when a blend of a nitrile-group containing fluoropolymer and another fluoropolymer lacking nitrile cure sites is used, an effective amount of a first selected curative compound is used to crosslink the fluoropolymer having interpolymerized units derived from a nitrile group-containing monomer together with an effective amount of a second selected curative compound used to crosslink the other fluoropolymer. The first and second selected curatives may have the same or different composition. That is, either one or both selected curatives may function to crosslink either one or both fluoropolymers.

Generally, the effective amount of curative, which may include more than one composition, is in the range of 0.1 to 10 parts curative per hundred parts of gum on a weight basis (phr) (more preferably 0.5 to 5 phr).

One of the advantages of the present invention is a clear fluoroelastomer or perfluoroelastomer. Of course, fillers such as carbon black, grease, oil, dust, and the like should be avoided when compounding the fluoropolymer of the invention to ensure that the clarity is not compromised by contaminants.

The fluoropolymer composition curing can also be modified by using other types of curatives along with the catalyst of the present invention. Examples of such curatives are known and include bis-aminophenols (e.g., U.S. Pat. No. 5,767,204 and U.S. Pat. No. 5,700,879), bis-amidooximes (e.g., U.S. Pat. No. 5,621,145), and ammonium salts (e.g., U.S. Pat. No. 5,565,512). In addition, organometallic compounds of arsenic, antimony, and tin can be used (e.g., U.S. Pat. No. 4,281,092, and U.S. Pat. No. 5,554,680). Particular examples include allyl-, propargyl-, triphenyl-allenyl-, and tetraphenyltin and triphenyltin hydroxide.

The fluoroelastomer compositions of the invention can be cured using one or more ammonia-generating compounds along with the curatives described above. "Ammonia-generating compounds" include compounds that are solid or liquid at ambient conditions but that generate ammonia under conditions of cure. Such compounds include, for example, hexamethylenetetramine (urotropin), dicyandiamide, and metal-containing compounds of the formula $A^{w+}(NH_3)_x Y^{w-}$, wherein $A^{w+}$ is a metal cation such as $Cu^{2+}$, $Co^{2+}$, $Co^{3+}$, $Cu^+$, and $Ni^{2+}$; w is equal to the valance of the metal cation; $Y^{w-}$ is a counterion, typically a halide, sulfate, nitrate, acetate or the like; and x is an integer from 1 to about 7.

Also useful as ammonia-generating compounds are substituted and unsubstituted triazine derivatives such as those of the formula:

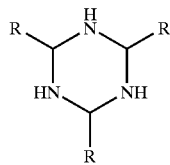

wherein R is a hydrogen atom or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer.

The fluoroelastomer compositions of the invention, including the nitrogen-containing cure site monomer-containing fluoropolymer alone, can be cured using one or more peroxide curatives along with a curative as described above. Suitable peroxide curatives generally are those which generate free radicals at curing temperatures, such as those described in WO 99/48939, the disclosure of which is herein incorporated by reference. Dialkyl peroxide and bis(dialkyl peroxide), each of which decomposes at a temperature above 50° C., are especially preferred. In many cases it is preferred to use a di-tertiarybutyl peroxide having a tertiary carbon atom attached to peroxy oxygen atom. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, a,a'-bis(t-butylperoxy-diisopropylbenzene), and di[1,3-dimethyl-3-(t-butylperoxy)-butyl]carbonate. Generally, about 1 to 3 parts of peroxide per 100 parts of perfluoroelastomer is used.

Another curative useful in the present invention has the general formula $CH_2=CHR_fCH=CH_2$, wherein one or more H atoms may be replaced with halogen atoms, such as F, and $R_f$ is a $C_1$–$C_8$ linear or branched and at least partially fluorinated alkylene, cycloalkylene, or oxyalkylene. Similarly, polymers containing pendant groups of $CH_2=CHR_f$ are also useful as curatives in the present invention. Such curatives are described, for example, in U.S. Pat. No. 5,585,449.

The combination of curative(s) is generally from about 0.01 to about 10 mol % (more preferably from about 0.1 to about 5 mol %) of the total fluoropolymer amount.

The fluoropolymer compositions can include any of the adjuvants commonly employed in curable fluoropolymer formulations. For example, one material often blended with a fluoropolymer composition as a part of a curative system is a coagent (sometimes also referred to as a co-curative) composed of a polyunsaturated compound that is capable of cooperating with the peroxide curative to provide a useful cure. These coagents are particularly useful in combination with a peroxide curative. The coagent(s) can generally be added in an amount equal to between 0.1 and 10 parts coagent per hundred parts fluoropolymer (phr), preferably between 1 and 5 phr. Examples of coagents useful with the organo-onium compound of the present invention include triallyl cyanurate; triallyl isocyanurate; tri(methylallyl) isocyanurate; tris(diallylamine)-s-triazine; triallyl phosphite; N,N-diallyl acrylamide; hexaallyl phosphoramide; N,N,N', N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bis-olefins disclosed in EP0661304A1, EP0784064A1, EP0769521A1, and U.S. Pat. No. 5,585,449.

Thus, a particular composition of the present invention may include two or more fluoropolymer(s) (provided that at least one fluoropolymer includes interpolymerized units derived from a nitrogen-containing cure site monomer), an amidine curative, a peroxide curative selected to crosslink one or more than one of the fluoropolymer(s), and optionally a coagent such as triallyl isocyanurate.

Additives such as carbon black, stabilizers, plasticizers, lubricants, fillers including fluoropolymer fillers, and processing aids typically utilized in fluoropolymer compounding can be incorporated into the compositions, provided that they have adequate stability for the intended service conditions. In some embodiments, additives that detrimentally affect the clarity of the composition are avoided. In particular, low temperature performance can be enhanced by incorporation of perfluoropolyethers. See, e.g., U.S. Pat No. 5,268,405.

Carbon black fillers can be used to balance properties such as modulus, tensile strength, elongation, hardness, abrasion resistance, conductivity, and processability of the compositions. Suitable examples include MT blacks (medium thermal black) designated N-991, N-990, N-908, and N-907; FEF N-550; and large particle size furnace blacks. When large size particle black is used, 1 to 70 parts filler per hundred parts fluoropolymer (phr) is generally sufficient.

One or more acid acceptors can also be added to the formulations. However, where the presence of extractable metallic compounds is undesirable (such as for semiconductor applications) the use of inorganic acid acceptors should be minimized, and preferably avoided altogether. Commonly used acid acceptors include, for example, zinc oxide, calcium hydroxide, calcium carbonate, magnesium oxide, silicon dioxide (silica), etc. These compounds generally are used in the fluoropolymer formulation to bind any HF or other acids that might be generated at the high temperatures such as may be encountered during curing steps or at the temperatures where the fluoropolymers are intended to function.

The curable fluoropolymer compositions of the invention may also be combined with other curable fluoropolymer compositions such as peroxide-curable fluoropolymer compositions. These additional curable fluoropolymer compositions may also employ small amounts of cure site monomers as a comonomer. Suitable cure site monomers are those which, when combined with a curative (e.g., a peroxide) and, preferably a coagent, will provide a cured composition.

Preferably these cure site monomers include at least one halo group (e.g., a bromo or an iodo group).

The curable fluoropolymer compositions can be prepared by mixing one or more fluoropolymer(s), the catalyst, any selected additive or additives, any additional curatives (if desired), and any other adjuvants (if desired) in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. The temperature of the mixture during the mixing process typically should not rise above about 120° C. During mixing, it is preferable to distribute the components and adjuvants uniformly throughout the gum.

The mixture is then processed and shaped, such as by extrusion (e.g., into the shape of a film, tube, or hose) or by molding (e.g., in the form of sheet or an O-ring). The shaped article can then be heated to cure the fluoropolymer composition and form a cured article.

Molding or press curing of the compounded mixture usually is conducted at a temperature sufficient to cure the mixture in a desired time duration under a suitable pressure. Generally, this is between about 95° C. and about 230° C., preferably between about 150° C. and about 205° C., for a period of from about 1 minute to 15 hours, typically from 5 minutes to 30 minutes. A pressure of between about 700 kPa and about 21,000 kPa is usually imposed on the compounded mixture in a mold. The molds first may be coated with a release agent and baked.

The molded mixture or press-cured article is then usually post-cured (e.g., in an oven) at a temperature and for a time sufficient to complete the curing, usually between about 150° C. and about 300° C., typically at about 230° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is preferably about 300° C., and this value is held for about 4 hours or more. This post-cure step generally completes the cross-linking and may also release residual volatiles from the cured compositions. One example of a suitable post-cure cycle involves exposing molded parts to heat under nitrogen using six stages of conditions. First, the temperature is increased from 25 to 200° C. over 6 hours, then the parts are held at 200° C. for 16 hours, after which the temperature is increased from 200 to 250° C. over 2 hours. Then the parts are held at 250° C. for 8 hours, after which the temperature is increased from 250 to 300° C. over 2 hours. Then the parts are held at 300° C. for 16 hours. Finally, the parts are returned to ambient temperature such as by shutting off the oven heat.

An optically transparent fluoropolymer of the invention is intrinsically capable of transmitting electromagnetic radiation in the wavelength range corresponding to visible light (approximately 390–800 nanometers). In some embodiments, the fluoropolymer blocks some light while transmitting from about 25% to about 95%. In specific embodiments, from about 35% to about 75% of light can be transmitted through the polymer. These ranges include all levels in between their end points. As more light is blocked, the fluoropolymer can be described as translucent. In some aspects of the present invention, the fluoropolymer has a haze level of below about 50% percent, and clarity of greater than about 25%.

The optical properties of the inventive fluoropolymers can be measured using a "haze-gard plus" light meter from BYK-Gardner USA, Silver Spring, Md., or a Lambda 20 UV-VIS spectrophotometer from Perkin Elmer, using known methods. Further guidance is found in ASTM D-1033—Standard Test Method for Haze and Luminous Transmittance of Transparent Plastics and ASTM D1003-92.

The fluoropolymer compositions are useful in production of articles such as O-rings, gaskets, tubing, and seals, especially when a clear perfluoroelastomer article is desired. Such articles are produced by molding a compounded formulation of the fluoropolymer composition with various additives under pressure, curing the article, and then subjecting it to a post-cure cycle. The curable compositions formulated without inorganic acid acceptors are particularly well suited for applications such as seals and gaskets for manufacturing semiconductor devices, and in seals for high temperature automotive uses.

The invention will now be described further by way of the following examples.

EXAMPLES

The indicated results were obtained using the following test methods, unless otherwise noted. The test results appear in the tables below.

Cure rheology: Tests were run on uncured, compounded samples using a Monsanto Moving Die Rheometer (MDR) Model 2000 in accordance with ASTM D 5289-93a at 177° C., no pre-heat, 30 minute elapsed time, and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ("$t_s2$"), the time for the torque to reach a value equal to $M_L+0.5(M_H-M_L)$ ("t'50"), and the time for the torque to reach $M_L+0.9(M_H-M_L)$ ("t'90").

Press-Cure: Sample sheets measuring 150×150×2.0 mm were prepared for physical property determination by pressing at about 6.9 Mega Pascal (MPa) for 15 minutes at 177° C., unless otherwise noted.

Post-Cure: Press-cured sample sheets were exposed to heat under nitrogen using the following conditions: 150° C. for 16 h; 230° C. for 8 h; and 250° C. for 16 h for Example 1, 175° C. for 16 h; 230° C. for 8 h; and 250° C. for 4 h; and 300° C. for 20 h in Example 2; 150° C. for 8 h; 200° C. for 16 h; 250° C. for 24 h; and 300C for 24 h in Example 3; and 150° C. for 16 h; 230° C. for 2 h; and 250° C. for 6 h in Example 4. The samples were returned to ambient temperature before testing.

Physical Properties: Tensile Strength at Break, Elongation at Break, and Modulus at 100% Elongation were determined using ASTM D 412-92 on samples cut from the press-cure or post-cure sheet with ASTM Die D. Units are reported in percent and MPa.

Hardness: Samples were measured using ASTM D 2240-85 Method A with a Type A-2 Shore Durometer. Units are reported in points on the Shore A scale.

Compression set: O-ring samples were measured using ASTM 395-89 Method B. The O-rings had a cross-sectional thickness of 0.139 in. (3.5 mm.). Results are reported as a percentage of the original deflection.

Color, Haze and Optical Properties: Samples were measured using a Perkin Elmer Lambda 20 UV-VIS spectrophotometer, using a 2 inch (5 cm) diameter integrating sphere. The illuminant source was CIE D65 with an observer angle of 10 degrees. Haze was measured according to ASTM D1003-92 over 380–780 nm range with 5 nm intervals.

All materials were commercially available from Aldrich Chemical Co., Milwaukee, Wis. unless otherwise indicated.

Curative Preparation

Curative A. Perfluoroadiponitrile Bisamidine, NH$_2$(NH=)C(CF$_2$)$_4$C(=NH)NH$_2$ A 4 L plastic flask equipped with magnetic stirring was charged with methanol (188 g, 5.9 mol) and perfluoroadipoyl fluoride (454 g, 1.5 mol), available from 3M Company, was added over one hour. A caustic scrubber was used for treating the hydrofluoric acid byproduct. Perfluoroadipate (446 g, 1.4 mol) was isolated by addition of water followed by distillation of the lower fluorochemical product phase. A 2 L flask equipped with a mechanical stirrer charged perfluoroadipate (446 g, 1.4 mol) in methanol was reacted with an excess of ammonia (54 g, 3.2 mol) gave perfluoroadipoyl amide (385 g, 1.3 mol) after vacuum drying. A 3 L flask with a mechanical stirrer charged a solution of perfluoroadipoyl amide (385 g, 1.3 mol) in dimethylformamide was reacted at –10° C. first with pyridine (508 g, 6.4 mol) followed by trifluoroacetic anhydride (674 g, 3.2 mol) available from Aldrich. Perfluoroadiponitrile (235 g, 0.9 mol) with a 64° C. boiling point was isolated by addition of water followed by distillation of the lower fluorochemical product phase. A 1 L flask equipped with a mechanical stirrer was charged with perfluoroadiponitrile (108 g, 0.4 mol) in diethyl ether and reacted at –10° C. with ammonia (17 g, 1.0 mol) to give perfluoroadiponitrile bisamidine (112 g, 0.9 mol) after vacuum drying having a melting point of 132° C. and the structure confirmed by fluorine and proton NMR.

Curative B. Di-perfluoromethoxypropionic Acid Salt of Perfluoroadiponitrile Bisamidine, CF$_3$OCF$_2$CF$_2$COO—NH$_3$+(NH=)C(CF$_2$)$_4$C(=NH)NH$_3$+—OOCCF$_2$CF$_2$OCF$_3$ A 100-mL flask equipped with a magnetic stirrer was charged perfluoroadiponitrile bisamidine (26 g, 0.1 mol) prepared as in Curative A (above) and dissolved in methanol and titrated with perfluoromethoxypropionic acid (46 g, 0.2 mol) prepared by water hydrolysis of perfluoromethoxypropionyl fluoride as described in WO 01/46116. Di-perfluoromethoxypropionic acid salt of perfluoroadiponitrile bisamidine (59 g, 0.8 mol) was isolated after vacuum drying. The structure was confirmed by fluorine and proton NMR.

Curative C. Di-perfluorooctanoic Acid Salt of Perfluorotetraethylene Oxide Dinitrile Bisamidine, C$_7$F$_{15}$COO—NH$_3$+(NH=)C(CF$_2$OCF$_2$)$_3$C(=NH)NH$_3$+—OOCC$_7$F$_{15}$ This compound can be prepared by direct fluorination of tetraethylene glycol diacetate as described in U.S. Pat. No. 5,488,142 to isolate perfluorotetraethylene oxide dimethyl ester. Then following the synthetic sequence as described in the above Curative A by first reaction with ammonia to make the bisamide, dehydration to give the bisnitrile and then reaction with ammonia to give the fluorochemical bisamidine. Titration of the fluorochemical bisamidine with perfluorooctanoic acid (available from 3M Company) as described in Curative B would give di-perfluorooctanoic acid salt of perfluorotetraethylene oxide dinitrile bisamidine.

Curative D. Di-acetic Acid Salt of Perfluorotetraethylene Oxide Dinitrile Bisamidine, CH$_3$COO—NH$_3$+(NH=)C(CF$_2$OCF$_2$)$_3$C(=NH)NH$_3$+—OOCCH$_3$ This compound can be prepared as in Curative C to reach the fluorochemical bisamidine. Titration of the fluorochemical bisamidine with acetic acid as described in Curative B would give di-acetic acid salt of perfluorotetraethylene oxide dinitrile bisamidine.

Example 1

Emulsion polymerization was used to prepare a fluoroelastomer that contained interpolymerized units of 65.7 mole percent tetrafluoroethylene (mol % TFE), 33.0 mol % perfluoromethyl vinyl ether (PMVE), and 1.3 mol % of a nitrile group-containing cure site monomer, CF$_2$=CFO(CF$_2$)$_5$CN.

The fluoropolymer (100 g basis) was compounded with 3.8 phr of a bisamidine of the formula:

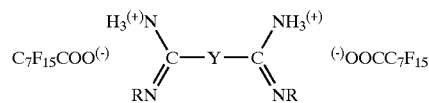

wherein Y was (CF$_2$OCF$_2$)$_3$ and each R was a hydrogen atom. This curative can be prepared by the following procedure described as Curative C (above).

Cure rheology tests were run on the uncured, compounded sample. The results are in the table below. A sheet of the compounded admixture was pressed cured, tested, and subsequently post-cured and tested for physical properties including compression set. The test results are in the table below.

Example 2

The fluoropolymer of Example 1 (100 g basis) was compounded with 2.6 phr of a bisamidine of the formula:

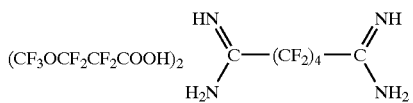

This curative was prepared as described in Curative A (above). The compound was prepared and tested as in Example 1. The test results are included in the table below.

Example 3

The fluoropolymer of Example 1 (100 g basis) was compounded with 1 phr of a bisamidine of the formula:

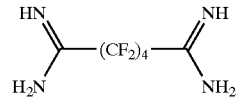

This curative was prepared as described in Curative A (above). The compound was prepared and tested as in Example 1. The sample was crystal clear after press curing and post curing. The test results are included in the table below.

Optical Properties of Example 3:

| Tristimulus: | X = 84.3 | Y = 89.0 | Z = 94.1 |
| Chromaticity | x = 0.315 | y = 0.333 | z = 0.352 |
| CIE L*A*B | L* = 95.6 | A* = –0.112 | B* = 0.914 |
| Whiteness: | W = 84.91 | T = 0.156 | |
| Yellowness: | Y = 9.1729 | | |
| Haze | | | 35.10% |
| Total transmission | | | 89.10% |
| Diffuse transmission: | | | 31.20% |

Example 4

The fluoropolymer of Example 1 (100 g basis) was compounded with 1.66 phr of a bisamidine of the formula:

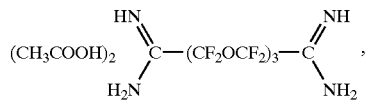

and 2.7 phr of an amidine of the formula $C_7F_{15}C(=NH)(NH_2)$ (can be made the same way as the Curative A starting from perfluorooctanoylfluoride, reacting with methanol, then with $NH_3$, followed by dehydration to the nitrile, then reacting with $NH_3$ to reach the amidine.

This curative can be prepared as described in Curative D (above). The compound was prepared as in Example 1. The sample was crystal clear after press curing and post curing. The compression set test was run on the material and the results are included in the table below.

In the following table, N/A indicates that the property was not measured, TS means Tensile Strength at Break and EB means Elongation at Break.

TABLE 1

Test Results

| Example: | | 1 | 2 | 3 | 4 |
|---|---|---|---|---|---|
| Cure Rheology | $M_L$ (N m) | 0.056 | 0.149 | 0.301 | 0.181 |
| | $M_H$ (N m) | 0.604 | 0.625 | 0.940 | 0.746 |
| | $t_s2$ (min) | 1.86 | 1.23 | 0.61 | 0.68 |
| | t'50 (min) | 2.27 | 1.28 | 0.77 | 0.81 |
| | t'90 (min) | 7.48 | 5.56 | 3.10 | 6.19 |
| Press and Post Cured | TS (MPa) | 12.23 | 14.44 | 3.82 | N/A |
| | EB (%) | 252 | 257 | 208 | N/A |
| | 100% Modulus (MPa) | 1.52 | 2.45 | 1.68 | N/A |
| | Shore A Hardness | 57 | 54 | 56 | N/A |
| Compression Set | 70 hrs at 230° C. (%) | 10.0 | N/A | N/A | N/A |
| | 70 hrs at 250° C. (%) | N/A | N/A | N/A | 18.2 |
| | 70 hrs at 300° C. (%) | N/A | 58.2 | N/A | N/A |
| | 70 hrs at 316° C. (%) | 32.3 | 60.2 | N/A | 31.2 |
| Appearance | | Clear | Clear* | Clear | Clear |

The fluoropolymer sheet of Example 2 was clear although the sample contained machine oils and contamination. Minimizing such contamination will improve the appearance.

A number of embodiments of the invention have been described. Nevertheless, it will be understood that various modifications may be made without departing from the spirit and scope of the invention. All publications and patents cited herein are incorporated by reference to the same extent as if each individual publication or patent was specifically and individually indicated to be incorporated by reference.

We claim:

1. A composition comprising:
   (a) a fluoropolymer comprising interpolymerized units derived from a nitrogen-containing cure site monomer; and
   (b) an amidine-containing curative, wherein the curative is a bis-amidine, tris-amidine, or tetra-amidine, or a salt thereof.

2. The composition of claim 1 wherein the curative comprises a compound having the general formula X—Y (—Z)$_n$ wherein X is a moiety of Formula I:

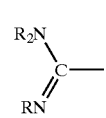

wherein each R is, independently, H, an optionally substituted alkyl, alkenyl, aryl, alkaryl, or alkenylaryl group, Y is a bond or a linking group, Z is H or a moiety according to Formula I, which may be the same or different than X, and n is an integer from 1 to 3; or a salt thereof, or the precursors of the salt thereof provided separately or as a mixture.

3. The composition of claim 1 wherein the curative is a carboxylate salt of an amidine, which optionally is fluorinated or perfluorinated.

4. The composition of claim 1 wherein the curative comprises a compound of the formula:

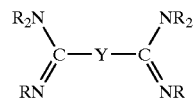

wherein Y is selected from a linking group and $CX_2OCX_2$, each X is independently H, F, or Cl, each R is independently selected from H, a C1–C8 alkyl, alkenyl, a C6–C15 aryl, alkaryl, or alkenylaryl, and wherein R is optionally substituted.

5. The composition of claim 4 wherein each R is independently selected from H, a C1–C6 alkyl and wherein R is optionally substituted.

6. The composition of claim 4 wherein each R is H.

7. The composition of claim 2 wherein Z is X.

8. The composition of claim 1 wherein the curative comprises a compound of the formula:

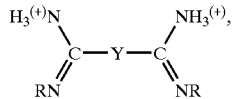

wherein Y is a linking group, and each R is, independently, H, an optionally substituted alkyl, alkenyl, aryl, alkaryl, or alkenylaryl group.

9. The composition of claim 1 wherein the curative is selected from the formula

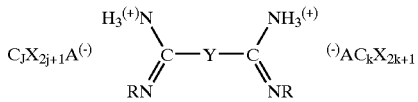

wherein j and k range from 1 to about 12, Y is $(CX_2OCX_2)_p$, p is 1 to 5, each X is independently H, F, or Cl, each R is independently selected from H, a C1–C8 alkyl, alkenyl, a C6–C15 aryl, alkaryl, or alkenylaryl, and wherein R is optionally substituted, and A is an anion.

10. The composition of claim 1 wherein the curative comprises a compound of the formula:

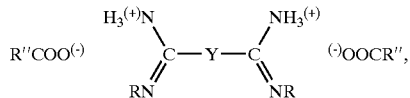

wherein R" is an optionally substituted alkyl, alkenyl, aryl, alkaryl, or alkenylaryl group, which may be non-fluorinated, partially-fluorinated, or perfluorinated, and each R is, independently, H, an optionally substituted alkyl, alkenyl, aryl, alkaryl, or alkenylaryl group.

11. The composition of claim 1 wherein the curative comprises a compound of

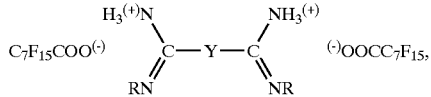

the formula:
wherein each R is an optionally substituted alkyl, alkenyl, aryl, alkaryl, or alkenylaryl group, which may be non-fluorinated, partially non-fluorinated, or perfluorinated, and Y is a linking group.

12. The composition of claim 11 wherein Y is selected from $(CF_2OCF_2)_m$ wherein m is an integer from 1 to 10.

13. The composition of claim 11 wherein m is 3.

14. The composition of claim 1 wherein the fluoropolymer is perfluorinated.

15. The composition of claim 1 wherein the fluoropolymer comprises interpolymerized units derived from (i) tetrafluoroethylene, and (ii) a fluorinated comonomer, and optionally (iii) one or more perfluorovinyl ethers.

16. The composition of claim 15 wherein the fluorinated comonomer is selected from perfluoroolefins, partially-fluorinated olefins, non-fluorinated olefins, vinylidene fluoride, and combinations thereof.

17. A composition according to claim 1 wherein said cure site monomer comprises a nitrile-containing monomer.

18. A composition according to claim 17 wherein said cure site monomer is a compound of the formula $CF_2$=CFO $(CF_2)_L$CN; $CF_2$=CFO$(CF_2)_u$OCF$(CF_3)$CN; $CF_2$=CFO [$CF_2$CF($CF_3$)O]$_q$($CF_2$O)$_y$CF($CF_3$)CN; or $CF_2$=CF [OCF$_2$CF($CF_3$)]$_r$O($CF_2$)$_t$CN; wherein L=2–12; q=0–4; r=1–2; y=0–6; t=1–4; and u=2–6; perfluoro(8-cyano-5-methyl-3,6-dioxa-1-octene), and $CF_2$=CFO$(CF_2)_5$CN.

19. A composition according to claim 1 further comprising a filler, optionally selected from fluoropolymer filler, carbon black, and combinations thereof.

20. The composition of claim 1 wherein the fluoropolymer is selected from a fluoroelastomer and a fluoroplastic.

21. The composition of claim 1 further comprising an additional curative.

22. The composition of claim 21 wherein the additional curative is selected from ammonia-generating compounds, substituted triazine derivatives, unsubstituted triazine derivatives, peroxides, bis-aminophenols, bis-amidooximes, and organotin compounds.

23. A shaped article comprising the fluoropolymer composition of claim 1.

24. The article of claim 23 having a visible light transmission selected from at least about 35%, 40%, 45%, 50%, 55%, 60%, 65%, 70%, 75%, 80%, 85%, 90%, and 95%.

25. The article of claim 23 having a compression set value after 70 hours at 250° C. or higher, selected from below about 65%, 60%, 55%, 50%, 45%, 40%, 35%, 30%, 25%, and 20%.

26. The composition of claim 1 further comprising a fluoropolymer having interpolymerized units derived from monomers selected from the group consisting of perfluoroolefins, partially-fluorinated olefins, non-fluorinated olefins, vinylidene fluoride, perfluorovinyl ethers, and combinations thereof.

27. The composition of claim 26 further comprising a curative material selected from ammonium salts, ammonia-generating compounds, substituted triazine derivatives, unsubstituted triazine derivatives, peroxides, bis-aminophenols, bis-amidooximes, and organotin compounds; and optionally a coagent.

28. The composition of claim 27 wherein the coagent is selected from triallyl cyanurate; triallyl isocyanurate; tri (methylallyl)isocyanurate; tris(diallylamine)-s-triazine; triallyl phosphite; N,N-diallyl acrylamide; hexallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene) cyanurate.

29. The composition of claim 26 wherein the additional fluoropolymer includes interpolymerized units containing a halogen that is capable of participation in a peroxide cure reaction and wherein the additional curative is a peroxide, and optionally further comprising a triallyl cyanurate coagent.

30. A method of making a fluoropolymer composition comprising:
(c) forming a mixture comprising a composition according to claim 1;
(d) shaping the mixture;
(e) curing the shaped mixture; and optionally
(f) heat aging the cured mixture.

31. The method of claim 30 wherein the curative is an amidine salt.

32. The method of claim 31 wherein the precursors to the amidine salt are added to the mixture.

* * * * *

UNITED STATES PATENT AND TRADEMARK OFFICE
CERTIFICATE OF CORRECTION

PATENT NO. : 6,846,880 B2
DATED : January 25, 2005
INVENTOR(S) : Grootaert, Werner M.A.

It is certified that error appears in the above-identified patent and that said Letters Patent is hereby corrected as shown below:

Column 5,
Lines 18-19, insert the following paragraph after "$OSO_3$" . and before "Other"

-- Other amidine-containing curative examples include compounds of the formula:

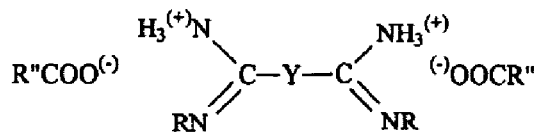

wherein R" is an optionally substituted alkyl, alkenyl, aryl, alkaryl, or alkenylaryl group, which may be non-fluorinated, partially-fluorinated, or perfluorinated. --

Line 28, "alkonylaryl" should be shown as -- alkenylaryl --

Column 8,
Line 7, "$C_{1-C12}$" should be shown as -- $C_1$-$C_{12}$ --

Column 9,
Line 60, "$CH_2=CHR_f$" should be shown as -- $CH_2=CHR_{f'}$ --

Column 13,
Line 34, "-$OCCF_2CF_2OCF_3$" should be shown as -- -$OOCCF_2CF_2OCF_3$ --

Column 16,
Line 56, after the word "alkyl" insert -- or alkenyl --

Column 17,
Line 3, The words -- 9. The composition -- should start on a new line because it is the start of a claim.
Line 47, "of" should be shown as -- according to --
Line 51, "of" should be shown as -- according to --

UNITED STATES PATENT AND TRADEMARK OFFICE
CERTIFICATE OF CORRECTION

PATENT NO. : 6,846,880 B2
DATED : January 25, 2005
INVENTOR(S) : Grootaert, Werner M.A.

It is certified that error appears in the above-identified patent and that said Letters Patent is hereby corrected as shown below:

Column 18,
Line 38, "hexallyl' should be shown as -- hexaallyl --

Signed and Sealed this

Twenty-sixth Day of April, 2005

JON W. DUDAS
*Director of the United States Patent and Trademark Office*